United States Patent [19]

Fair et al.

[11] Patent Number: 4,714,534
[45] Date of Patent: Dec. 22, 1987

[54] ELECTROLYTIC HALOGENATOR DEVICE

[75] Inventors: David L. Fair, Cheshire; Robert A. Dean, Guilford, both of Conn.; Arlon G. Sangster, Sterling, Mass.

[73] Assignee: Olin Corporation, Cheshire, Conn.

[21] Appl. No.: 876,545

[22] Filed: Jun. 20, 1986

[51] Int. Cl.[4] .................. C25B 9/00; C25B 11/02; C25B 9/04
[52] U.S. Cl. .................. 204/269; 204/271; 204/279; 204/286
[58] Field of Search .................. 204/269-270, 204/271, 275-278, 95, 128, 286, 279

[56] References Cited

U.S. PATENT DOCUMENTS

| 1,000,608 | 8/1911 | Kenevel | 204/269 |
| 3,055,821 | 9/1962 | Holmes et al. | 204/270 |
| 3,451,906 | 6/1969 | Weed | 204/82 |
| 4,088,550 | 5/1978 | Malkin | 204/95 |
| 4,100,052 | 7/1978 | Stillman | 204/268 |
| 4,194,953 | 3/1980 | Hatherly | 204/269 X |
| 4,202,738 | 5/1980 | Stillman | 204/95 |
| 4,248,690 | 2/1981 | Conkling | 204/95 X |
| 4,385,973 | 5/1983 | Reis et al. | 204/149 |
| 4,414,088 | 11/1983 | Ford | 204/270 X |
| 4,422,919 | 12/1983 | Fabian et al. | 204/270 |
| 4,425,216 | 1/1984 | Neymeyer | 204/270 X |

Primary Examiner—Donald R. Valentine
Attorney, Agent, or Firm—Ralph D'Alessandro; Thomas P. O'Day

[57] ABSTRACT

Disclosed is an electrolytic cell used to produce dilute quantities of a halogen solution from water containing dilute quantities of salt to disinfect and sanitize the water, the cell further employs monopolar electrodes of trapezoidal shape and an electrode separating plates that ensures proper alignment and equal separation of the electrode plates during operation.

12 Claims, 7 Drawing Figures

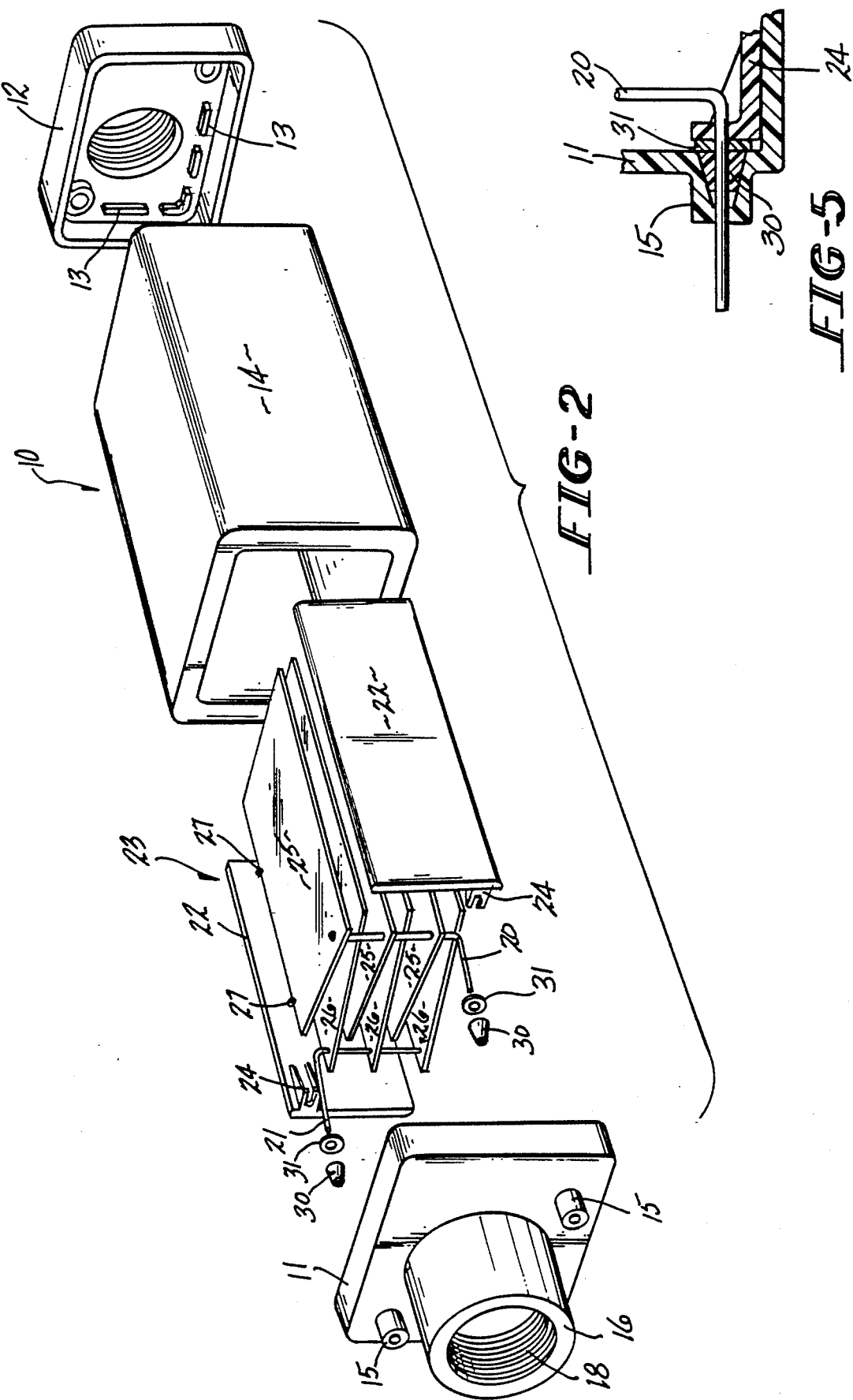

4,714,534

ELECTROLYTIC HALOGENATOR DEVICE

BACKGROUND OF THE INVENTION

This invention relates generally to electrolytic halogenators for use in the production of halogen biocidally active agents for the disinfection and sanitizing of waters. More particularly, the present invention relates to an improved monopolar electrolytic cell that is used in conjunction with a circulating pump associated with the circulation of water in a swimming pool to generate a dilute quantity of sodium hypochlorite solution from water containing dilute quantities of salt.

Chlorine has long been used as a biocidally active agent for use in water in swimming pools or cooling towers, in addition to drinking water. This has traditionally been accomplished with the chemical treatment of these waters with chemical compounds, such as granular or tabletted hypochlorite compounds. Several disadvantages result from the use of chemical compounds to accomplish this. These include the necessity to retain water treatment chemicals on site and the fluctuation in the water quality level due to the periodic additions to the water of the pool chemicals by either broadcast or floating dissolution methods.

More recently electrolytic chlorinators have been used to produce dilute quantities of sodium hypochlorite solutions from waters containing dilute quantities of salt. Two general types of electrolytic chlorinators are in use. The first type employs the monopolar electrode system with at least two platinum electrodes that are expanded mesh, conical in shape, and concentrically arranged within the cell. This type of design has limitations. The salt concentrations must be kept relatively high because of the low chlorine activity of the electrodes. Salt concentrations of approximately 6,000 parts per million must be used. The active electrode area within the cell of this design is reduced because of the expanded mesh design employed. Additional electrodes cannot be easily added because of the conical shape and the concentrical arrangement within the electrolytic cell.

The second type of electrolytic chlorinator employs a bipolar electrode arrangement with approximately 15 flat plate electrodes. The electrode spacing in this design is very narrow in order to control the cell voltage requirements. This narrow spacing increases the possibility of hardness scale building up on the electrodes and the possibility of electrical short circuiting occurring. A bipolar electrode configuration requires relatively high voltage which can produce leakage currents that are corrosive to other components in the system. To counteract this corrosion problem, sacrificial target electrodes are required to be used.

These problems are solved in the design of the electrolytic halogenator of the present invention by employing plate electrodes with a unique shape and a constant spacing and planarity to maintain low voltage performance by the halogenator with even current distribution across the electrodes.

SUMMARY OF THE INVENTION

It is an object of the present invention to provide an electrolytic halogenator employing electrodes with a unique shape that is low in cost to operate and easy to manufacture and assemble.

It is another object of the present invention to provide an electrolytic halogenator that provides an electrode and a bus bar design that is efficient and reduces the opportunity for electrical short circuiting.

It is a further ob3ect of the present invention to provide a design in an electrolytic halogenator that maintains uniform spacing and planarity between electrodes.

It is a feature of the present invention that generally trapezoidally shaped electrode plates are employed in a monopolar design that permits easy assembly.

It is a another feature of the present invention that separator plates are employed to achieve constant and uniform electrode spacing and planarity, as well as proper assembly location.

It is yet another feature of the present invention that the seal between the electrohalogenator housing and the individual electrode buses is such that leakage of product halogen or electrolyte to the external electrical cable connections is prevented and corrosion of the electrical cable connections is avoided.

It is another feature of the present invention that a fixture is employed in the electrohalogenator which guides the electrode bus and provides a stop for the compression of the bus seal or gasket.

It is an advantage of the present invention that the flat plate electrode design offers a large active surface area.

It is another advantage of the present invention that low voltage may be employed to reduce leakage current to a negligible level in order to to effectively help control corrosion.

It is another advantage of the present invention that uniform electrode spacing is achieved through the use of an inexpensive separator plate design.

It is another advantage of the present invention that a liquid-tight seal is effected at the junction of the end cap and the bus bar to prevent corrosion of the electrical connection between the cable from the power supply and the bus bar in the electrolytic halogenator.

These and other objects, features and advantages are obtained in the electrolytic cell for production of a precursor halogen for use in its final form as a hypohalite sanitizing agent in water by providing a plurality of generally planar electrode plates interleaved together, each electrode plate having two opposing parallel sides with a first side being longer than a second side and interconnected by an obliquely angled third side, the plurality of electrode plates being assembled so that the first longer side of each electrode plate is alternately arranged on an opposing side with respect to the adjacent electrode plates. The electrolytic cell further has a first bus bar connected to every other electrode plate and a second bus bar is connected to the remaining electrode plates, the connections to each electrode being adjacent the intersection of the first longer side and the obliquely angled third side.

BRIEF DESCRIPTION OF THE DRAWINGS

The advantages of this invention will become apparent upon consideration of the following detailed disclosure of the invention, especially when it is taken in conjunction with the accompanying drawings wherein

FIG. 2 is an exploded side perspective view of the electrolytic halogenator of FIG. 1 showing the two end caps, the central unit housing, the electrode plates and bus bars, and the electrode separator plates;

FIG. 5 is a partial cross-sectional view through an end cap and the separator plate of FIG. 1 showing the liquid-tight sealing arrangement of the seal fixture and gasket;

DETAILED DESCRIPTION OF THE PREFERRED EMBODIMENT

Figure 1:
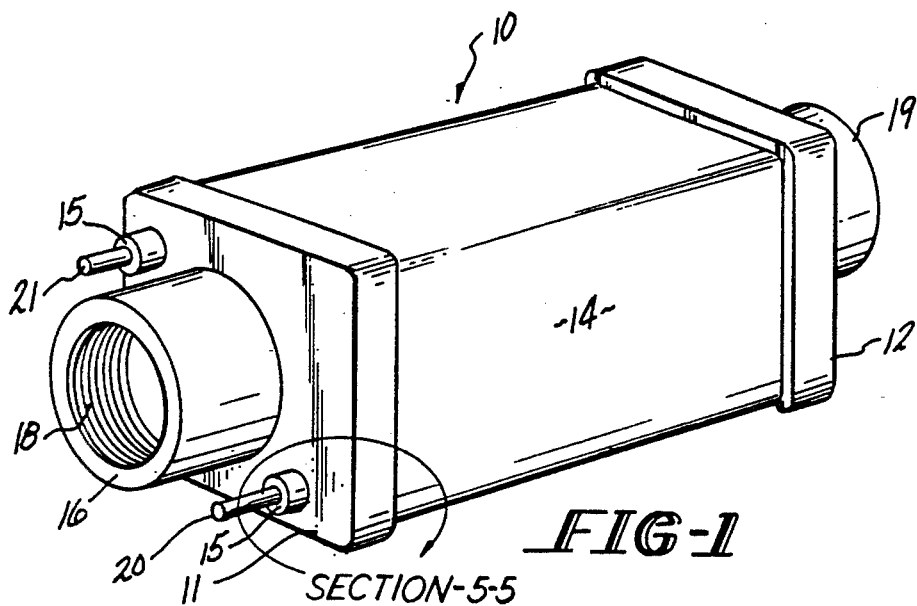
FIG. 1 is a side perspective view of the electrolytic halogenator rotated 90° longitudinally from the normal operating position.

FIG. 1 shows an electrolytic halogenator capable of conveniently producing on-site halogen for use in pool and spa sanitation The particular invention is primarily intended for use as an electrolytic chlorinator by the electrochemical production of chlorine and sodium hydroxide or caustic from salt water. The chlorine and sodium hydroxide produced electrochemically further react to form sodium hypochlorite and hydrogen gas. The sanitizing action of the sodium hypochlorite (NaOCl) releases oxygen and leaves the sodium chloride for use in the system. The concentration of salt in the water is maintained between about 2000-3000 parts per million.

The electrolytic halogenator, indicated generally by the numeral 10 in FIG. 1, has an inlet end cap 11 and an outlet end cap 12 which fit about a central housing 14 that contains the plate electrodes, best seen in FIG. 2. The plate electrodes are connected to the cathode bus bar 20 and an anode bus bar 21 that are directly connected to an electrical power source. Inlet end cap 11 has an inlet conduit 16 with inlet threads 18 and permit the electrolytic halogenator 10 to be connected to the flow line in a forced water pump circulating system. Similarly, the outlet end cap 12 has an outlet conduit 19 which is threadingly connected to the piping in the forced circulation system to return the water to the pool or spa. Each of the end caps have end cap guides 13, best seen in FIG. 2, which fit inside the walls of the central housing 14 and abut the separator plates 22 to securely hold the end caps in place.

Figure 7:
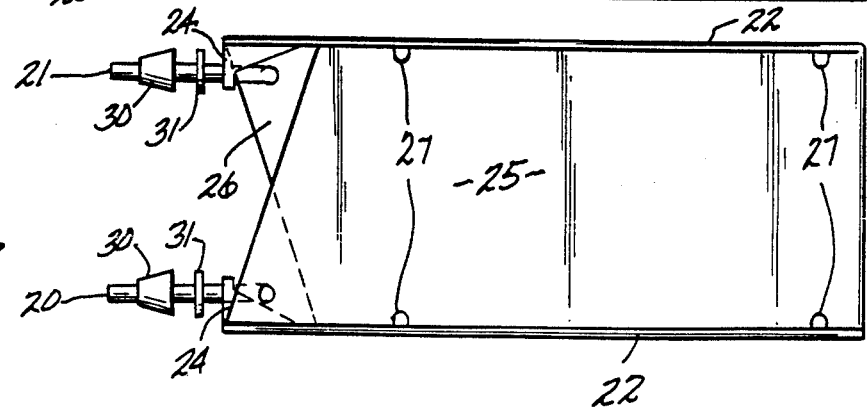
FIG. 7 is a top plan view of the generally trapezoidal electrode plates as they are retained by the separator plates.

The electrolytic halogenator 10 is shown in exploded form in FIG. 2 and is rotated 90° longitudinally from its normal operating position to permit the electrode plates to be better visible. Separator plates 22 are used on opposing sides of the generally trapezoidally shaped electrode plates to maintain a constant and uniform spacing between the electrodes. As seen in FIG. 2, the monopolar electrode plates alternate between cathode electrode plates 25 and anode electrode plates 26. The electrode plates are interleaved between each other in such a way that the anode bus bar 21 and the cathode bus bar 20 connect only to their respective anode and cathode electrode plates and do not touch each other. This interleaving is effected by the use of generally trapezoidally shaped electrode plates, each plate having only one end side obliquely angled while the opposing end side is rectangularly shaped. The two opposing parallel sides have a first side that is longer than the second side and are interconnected by an obliquely angled third side and a fourth side. As is best seen in FIGS. 2 and 7, the electrode plates are interleaved so that the area adjacent the intersection of the longer first side and the obliquely angled third side receives the bus bar. The first bus bar, for example the anode bus bar 21 is connected to every other electrode plate, for example the anode electrode plates 26. Similarly, the second bus bar, cathode bus bar 20, is connected to the remaining electrode plates, cathode electrode plates 25. The opposing or shorter second side of the two parallel sides created by the obliquely angled third side extends behind the opposing bus bar.

The inlet end cap 11 and the outlet end cap 12 are solvent welded to the central housing 14. The inlet end cap 11 and the outlet end cap 12 are identical, except for the molding of bus bar orifices 15 in the inlet end cap to permit the bus bars to extend therethrough. The end caps 11 and 12, the central housing 14 and the separator plates 22 are preferably made from polyvinyl chloride (PVC), although chlorinated polyvinyl chloride (CPVC), acrylonitrile butadiene styrene (ABS), or any other suitable material could also be employed.

Figures 3, 4:
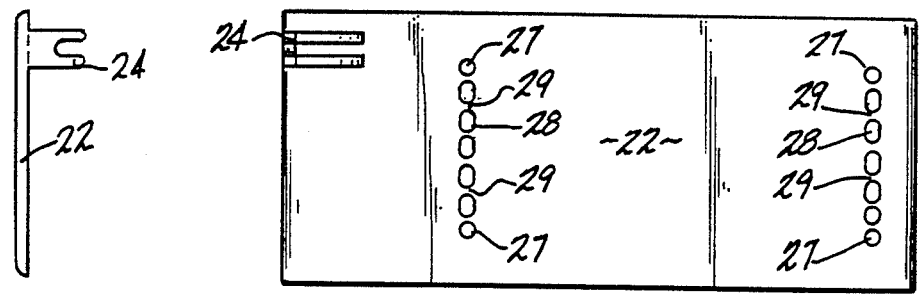
FIG. 3 is a top plan view of a separator plate.
FIG. 4 is an end elevational view of a portion of the separator plate of FIG. 3 showing the seal fixture.
Figure 6:
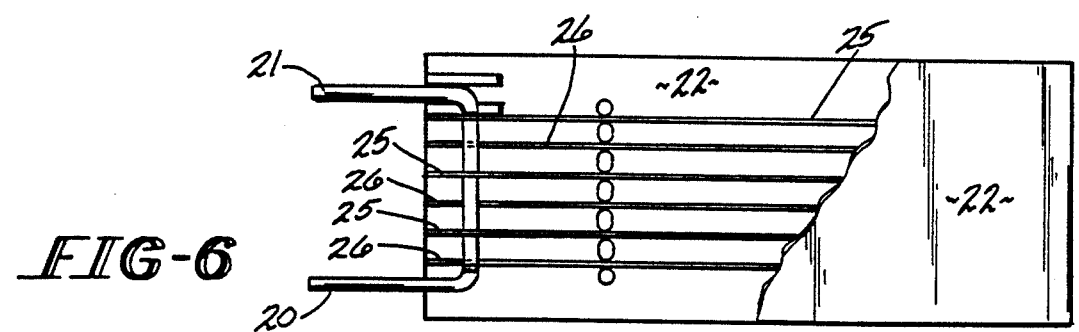
FIG. 6 is a side elevational view of the separator plates and electrodes of FIG. 2 with a portion of one separator plate broken away.

The separator plates 22 are partially shown in FIGS. 2, 6, 7 and best in FIGS. 3 and 4. The separator plates 22 can be injection molded to form the end electrode plate retainers 27 and the central electrode plate retainers 28 with the grooves 29 therebetween. A seal fixture or boss 24, best seen in FIGS. 3 and 4, is provided on an appropriate side to receive the bus bars 20 and 21. As can be readily understood from FIG. 1, the fixtures 24 are on diagonally opposed sides of the electrolytic halogenator 10. The bus bars 20 and 21 are angled to form a 90° bend so that one portion extends out through the inlet end cap 11 in a generally horizontal direction and the other portion is normal thereto and connected to the appropriate electrode plates. The cathode electrode plates 25 are thereby fastened together by welding to the cathode bus bar 20 and the anode electrode plates 26 are fastened together by welding to the anode bus bar 21. These welded cathode electrode plates 25 and the cathode bus bar 20 thus form an integral unit, as do the anode bus bar plates 26 and the anode bus bar 21.

The electrode plates are assembled into the electrolytic halogenator 10 by sliding the electrode plates between the electrode plate retainers 27 and 28. First one unit, such as the cathode electrode plate-cathode bus bar unit, is put in position so that the edges of the cathode electrode plates 25 fit in the grooves 29 of the paired electrode plate retainers 27 and 28, as can be seen from FIGS. 3 and 6. Next the anode electrode plate-anode bus bar unit is properly positioned and the electrode subunit, indicated generally by the numeral 23 in FIG. 2 is held in place by securing the separator plates 22. The electrode subunit 23 can then be inserted within the central housing 14. The end electrode plate retainers 27, seen in FIGS. 3, 6, and 7, serve to hold the two outside or end electrode plates in position between the immediately adjacent electrode plate retainers 28 and end electrode plate retainers 27.

As best seen in FIG. 7, the seal fixtures 24 have the cathode bus bar 20 and anode bus bar 21 fit through the use of a cut out section, best seen in FIG. 4. A washer 31, preferably made of PVC is placed over the individual bus bars until it seats against the U-shaped portion of the fixture 24, which acts as a stop. Next an elastomeric cone-shaped gasket 30 is slipped over each bus bar 20 and 21 until it seats firmly against the washer 31. The gaskets 30 are designed to surround the electrode bus and compress against the washer 31 and the stop on the fixture 24 when inserted into the interior portion of the bus bar orifice 15 in the inlet end cap 11. These bus bar orifices 15 have a cone-shaped depression on their inside face, as is best seen in FIG. 5. The elastomeric cone-shaped gasket 30 is compressed into the cone-shaped depression during assembly of the electrolytic halogenator 10 by the contact of the ends of the separator plates 22 opposite the fixtures 24 against the outlet end cap 12. This contact pressure of the ends of the separator plates 22 against the outlet end cap 12 is transmitted through the fixtures 24 to the washers 31 and the gaskets 30 to effect liquid-tight seals.

When the electrolytic halogenator 10 is fully assembled, the end caps 11 and 12 are solvent welded to the central housing 14 and pressure is maintained on the ends of the halogenator until the weld hardens. This liquid-tight seal is effected to permit dry electrical connections to be maintained between each bus bar 20 and 21 and the electrical cable connection (not shown) that feeds into the electrolytic halogenator 10 from the control box (not shown). The integrity of the seal increases with increasing internal pressure because the elastomeric seal deforms further into the conically tapered hole in the interior of the bus bar orifice 15 and further surrounds the appropriate bus bar. The elastomeric gasket 30 is made from any appropriate elastomer with a durometer range from about to 30 about 50. A preferred material is that sold under the tradename HYPALON synthetic rubber, since it provides good compression sealing characteristics and chemical corrosion resistance.

The electrode plates are fabricated from Grade 1 or 2 titanium sheets that are roll flattened and are coated with an appropriate electrocatalytic chlorine evolving coating. The electrode coatings should possess low chlorine overvoltage, high oxygen overvoltage and resistance to reverse current induced wear. The individual electrode plates have a thickness of approximately 0.025 inches and provide an approximately 750 square centimeter flat plate anode area. The gap between the interleaved cathode electrode plates 25 and the anode electrode plates 26 is between about 0.2 to about 0.5 inches. The monopolar electrode plates are coated on two sides, with the exception of each end electrode plate which have only the interior surface or face of the electrode plate coated Approximately 3 inch by approximately 13 inch strips of electrode material are sheared from the sheets of titanium and then diagonally cut to form two trapezoidally shaped electrodes. Holes are drilled through the triangular portions of the electrode plates adjacent the intersection of the first longer side and the third obliquely angled side to receive the bus bars. The bus bars are appropriately fastened by welding to the electrode plates.

The activated chlorine evolving coatings applied to the electrode plates can be selected from those commercially available from Eltech Corporation or Conradty Gmbh & Co. Metallelektroden K.G. utilizing either ruthenium oxide, platinium or lithium platinate base materials. Suitable coatings include the Eltech EC-400 coating or Conradty MT-2020 coating.

The electrolytic halogenator 10 is designed to operate with the chlorine evolving coatings on the electrode plates from direct current power obtained from a control box (not shown). The control box contains an AC to DC rectifier and transformer for converting the normal household current to the required DC output. The low voltage utilized by the electrolytic halogenator of the instant design also provides an attractive safety feature. A timer may be employed with a polarity reversal circuit to periodically change the anode and cathode potential to prevent scale buildup on the cathodic surfaces. The electrolytic halogenator 10 operates in conjunction with the pool or spa circulation and filtration pump system and is installed on the discharge side of the pump after the filter and, if present, the heater.

In order to exemplify the results achieved, the following Example is provided without any intent to limit the scope of the instant invention to the discussion therein. The Example is intended to illustrate the design and operating parameters of an electrolytic halogenator utilizing a particular coating and voltage level.

EXAMPLE

An electrolytic halogenator with Conradty platinum based, designated MT-2020, coatings on six electrode plates was connected to a flow system. Approximately 630 square centimeters of flat plate anode area and approximately 630 square centimeters of flat plate cathode area were provided. Anode and cathode bus bars were connected in alternating interleaved fashion to the electrode plates as seen in FIGS. 2 and 6. The connections included a flow meter on the upstream or inlet side of the electrolytic halogenator 10. The flow line was fed into a 500 gallon tank which recirculated the water through two additional 500 gallon tanks back into the electrolytic halogenator 10. A two filter filtration loop was run off of one of the additional 500 gallon tanks. Approximately 2500 parts per million of salt (NaCl) was added to the tank water. Testing was done with continuous operation 24 hours a day at 15 amps with current reversals automatically timed for every three hours. The test was conducted over 1600 hours. Sodium hypochlorite production at 15 amps ranged from about 0.28 to about 0.48 pounds of sodium hypochlorite per day with an average of about 0.39 pounds per day. The average current efficiency of the electrolytic halogenator was about 35%.

While the preferred structure in which the principles of the present invention for an electrolytic halogenator have been incorporated as shown and described above, it is to be understood that the invention is not to be limited to the particular details and methods thus presented. In fact, widely different means and methods may be employed in the practice of the broader aspects of this invention It is to be understood, for example, the electrolytic halogenator, though described in terms of producing chlorine, could well produce bromine or iodine. Similarly, the substrate utilized for the electrode plates may be any suitable valve metal, such as niobium, tantalum, tungsten, vanadium, zirconium and alloys thereof. It is equally possible to use one activated coating on the cathode electrode plates and another different coating on the anode electrode plates. The electrolytic halogenator can also be operated with an A.C. current source. The electrode plates could also employ two opposing substantially parallel sides interconnected by third and fourth sides that are both obliquely angled with respect to the two opposing substantially parallel sides, as long as the intersection of one of the two opposing parallel sides and one of the obliquely angled sides where the bus bar is connected is closer to the end cap through which the bus bar passes than the intersection of the other of the two opposing substantially parallel sides and the same obliquely angled side. The end caps could either have both bus bars through the inlet end cap or both bus bars through the outlet end cap or one bus bar through the inlet end cap and the other bus bar through the outlet end cap. The scope of the claims is intended to encompass all obvious changes in the method, the details and the art upon a reading of this disclosure.

Having thus described the invention, what is claimed is:

1. An electolytic cell for the production of hologen for use as a sanitizing agent in water, comprising in combination:
   a. a plurality of generally planar electrode plates having a hologen evolving coating and assembled in interleaved fashion, the electrode plates further having two opposing substantially parallel sides, a first side being longer than a second side, and interconnected by an obliquely angled third side with respect to the two opposing substantially parallel sides and a fourth side, the plurality of electrode plates being assembled so that the first longer side of each electrode plate is alternately arranged with respect to the adjacent electrode plates on an oposing side;
   b. a first bus bar and a second bus bar connectable to a source of electrical power external of the electrolytic cell connected to the plurality of generally planar electrode plates adjacent the intersection of the first longer side and the obliquely angled third side such that the first bus bar is connected to every other electrode plate and the second bus bar is connected to the remaining electrode plates;
   c. a housing surrounding the plurality of electrode plates within which the plurality of electrode plates fit;
   d. a plurality of electrode plate retaining means within the housing forming a plurality of grooves into which the two opposing parallel sides of the electrode plates fit to hold each electrode plate in place to maintain uniform spacing between the adjacent electrode plates;
   e. an inlet end closure means with an inlet conduit to close the inlet end of the electolytic cell and to permit water to flow into the cell for electrolysis, the inlet end closure means further having a first cone-shaped orifice through which the first bus bar passes and a scond cone-shaped orifice through which the second bus bar passes;
   f. an outlet end closure means with an outlet conduit to close the outlet end of the electolytic cell and to permit water and halogen to flow out of the cell;
   g. a first fixture and a second fixture connected to the housing through which pass the first bus bar and the second bus bar prior to exiting the cell; and
   h. a first elastomeric seal fitting about the first bus bar and a second elastomeric seal fitting about the second bus bar, the first eleastomeric seal and the second elastomeric seal being compressed into the first and second cone-shaped orifices, respectively, by the pressure of the inlet end closure means transmitted through the first fixture and the second fixture, respectively, to the first and second elastomeric seals to effect a liquid-tight seal at the first and second cone-shaped orifices.

2. The apparatus according to claim 1 wherein the plurality of electrode plate retaining means are further fastened to two separator plates that fit within the housing.

3. The apparatus according to claim 1 wherein the elastomeric seal is cone shaped.

4. The apparatus according to claim 3 wherein the first bus bar and second bus bar have washers between the elastomeric seal and the first fixture and second fixture.

5. The apparatus according to claim 3 wherein the inlet end closure means has a first orifice through which the first bus bar passes and the outlet end cap has a second orifice through which the second bus bar passes.

6. The apparatus according to claim 5 wherein the first bus bar and second bus bar each have a elastomeric seal that fits around each bus bar and within the first orifice and the second orifice.

7. The apparatus according to claim 6 wherein the elastomeric seal is cone shaped.

8. The apparatus according to claim 7 wherein the first bus bar and second bus bar have washers between the elastomeric seal and the first fixture and second fixture.

9. The apparatus according to claim 8 wherein the plurality of electrode plates are generally trapezoidally shaped.

10. The apparatus according to claim 3 wherein the plurality of electrode plate retaining means and the plurality of grooves are connected to a first and a second separator plate.

11. The apparatus according to claim 10 wherein the first fixture is connected to the first separator plate and the second fixture is connected to the second separator plate.

12. The apparatus according to claim 1 wherein the plurality of electrode plated are generally trapezoidally shaped.

* * * * *